United States Patent
Mayr et al.

(10) Patent No.: US 10,744,991 B2
(45) Date of Patent: Aug. 18, 2020

(54) HYDRAULIC BLOCK FOR A HYDRAULIC UNIT OF A BRAKE CONTROLLER OF A HYDRAULIC VEHICLE BRAKE SYSTEM

(71) Applicant: Robert Bosch GmbH, Stuttgart (DE)

(72) Inventors: Matthias Mayr, Rettenberg (DE); Dieter Pflaum, Krugzell (DE); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 15/081,000

(22) Filed: Mar. 25, 2016

(65) Prior Publication Data
US 2016/0280197 A1 Sep. 29, 2016

(30) Foreign Application Priority Data
Mar. 26, 2015 (DE) .................... 10 2015 205 543

(51) Int. Cl.
| | |
|---|---|
| B60T 17/04 | (2006.01) |
| B60T 13/68 | (2006.01) |
| B60T 8/36 | (2006.01) |
| B33Y 80/00 | (2015.01) |
| B60T 13/66 | (2006.01) |
| B60T 17/02 | (2006.01) |
| B22F 5/10 | (2006.01) |
| B22F 3/105 | (2006.01) |

(52) U.S. Cl.
CPC ............ *B60T 17/04* (2013.01); *B22F 3/1055* (2013.01); *B22F 5/10* (2013.01); *B33Y 80/00* (2014.12); *B60T 8/368* (2013.01); *B60T 13/662* (2013.01); *B60T 13/686* (2013.01); *B60T 17/02* (2013.01); *Y02P 10/295* (2015.11)

(58) Field of Classification Search
USPC .......................................................... 137/884
See application file for complete search history.

(56) References Cited

U.S. PATENT DOCUMENTS

| | | | | |
|---|---|---|---|---|
| 4,785,848 A | * | 11/1988 | Leiber ..................... | B60T 8/363 137/596.17 |
| 4,929,038 A | * | 5/1990 | Reinartz ............... | B60T 8/3675 137/596.17 |
| 5,595,712 A | * | 1/1997 | Harbster ............... | B01F 5/0604 156/290 |
| 6,312,061 B1 | * | 11/2001 | Schliebe ................... | B60T 8/00 303/20 |
| 8,500,218 B2 | * | 8/2013 | Fischbach-Borazio ..... B60T 8/368 303/10 |
| 8,820,359 B2 | * | 9/2014 | Hinkley ................. | B64G 1/402 137/884 |
| 9,524,367 B2 | * | 12/2016 | Streckert ............... | B05B 12/149 |
| 9,636,869 B2 | * | 5/2017 | Kroll ................... | B29C 67/0077 |

(Continued)

FOREIGN PATENT DOCUMENTS

| | | |
|---|---|---|
| CN | 101827736 A | 9/2010 |
| DE | 10 2006 059 924 A1 | 6/2008 |

*Primary Examiner* — John Fox
(74) *Attorney, Agent, or Firm* — Maginot, Moore & Beck LLP

(57) ABSTRACT

A hydraulic block for a hydraulic unit of a brake controller of a hydraulic vehicle brake system is configured to fit with hydraulic components such as solenoid valves of the brake controller. The hydraulic block is manufactured by 3D printing, which enables considerably more complex line routing than manufacture by machining.

7 Claims, 2 Drawing Sheets

(56) References Cited

U.S. PATENT DOCUMENTS

| | | | | |
|---|---|---|---|---|
| 2005/0133102 A1* | 6/2005 | Blackman | ............ | F15B 13/0814 |
| | | | | 137/884 |
| 2006/0138860 A1* | 6/2006 | Hinz | ........................ | B60T 8/368 |
| | | | | 303/119.3 |
| 2011/0062773 A1* | 3/2011 | Misunou | .................. | F04C 2/086 |
| | | | | 303/6.01 |
| 2011/0221100 A1* | 9/2011 | Wesselky | ............... | B05B 3/1092 |
| | | | | 264/401 |
| 2013/0061965 A1* | 3/2013 | Klaphake | ............ | F15B 13/0842 |
| | | | | 137/625.29 |
| 2013/0306180 A1* | 11/2013 | Weh | ........................ | F15B 21/00 |
| | | | | 137/884 |

* cited by examiner

HYDRAULIC BLOCK FOR A HYDRAULIC UNIT OF A BRAKE CONTROLLER OF A HYDRAULIC VEHICLE BRAKE SYSTEM

This application claims priority under 35 U.S.C. § 119 to patent application no. DE 10 2015 205 543.4, filed on Mar. 26, 2015 in Germany, the disclosure of which is incorporated herein by reference in its entirety.

BACKGROUND

The disclosure concerns a hydraulic block for a hydraulic unit of a brake controller of a hydraulic vehicle brake system.

Hydraulic blocks of this type are known. There are typically rectangular metal blocks that are approximately square in plan view and comprise a height of about ¼ to ⅓ of the width or length. The hydraulic blocks comprise receptacles for hydraulic components of the brake controller and lines for porting and/or connecting the receptacles or the components mounted in the receptacles. Hydraulic components of brake controllers of hydraulic vehicle brake systems are for example solenoid valves, non-return valves, chokes, hydraulic reservoirs, dampers and pumps. The receptacles are typically cylindrical blind holes that can have stepped diameters. Lines in the hydraulic block connect the receptacles or provide a connection in particular to a master brake cylinder and to hydraulic wheel brakes, i.e. the lines connect the hydraulic components to each other hydraulically. The receptacles and the lines are machined by drilling into the hydraulic block, wherein they mainly run orthogonally, i.e. parallel and/or perpendicular to edges and surfaces of the hydraulic block. The hydraulic components are introduced into the receptacles of the hydraulic block, for example pressed in, and are then through the lines in the hydraulic block, for example pressed in, and can then be hydraulically connected to each other by the lines in the hydraulic block and, for example, to a master brake cylinder and hydraulic wheel brakes. Fitted with the hydraulic components, the hydraulic block can also be regarded as a hydraulic unit for a brake controller of a hydraulic vehicle brake system. Such a hydraulic unit forms a core part of a brake controller of a hydraulic vehicle brake system. With such a brake controller, wheel brake pressures and thus wheel brake forces of hydraulic wheel brakes of a hydraulic vehicle brake system can be regulated, among other things anti-slip control, traction control and driving dynamics control being possible, for which abbreviations such as ABS, ASR, FDR and ESP are common. Such brake controllers are known to the person skilled in the art and are not described here. The patent application DE 10 2006 059 924 A1 discloses an example of a hydraulic block for a hydraulic unit of a brake controller of a hydraulic vehicle brake system.

Drilling of a hydraulic block forces straight lines with a circular cross-section that are open at one end at least, i.e. they open at a surface of the hydraulic block and have to be closed pressure tight, which is carried out for example by pressing in a ball. Moreover, bores, when implemented as blind holes, only enable diameter tapers. For diameter widening, bores must be drilled from the opposite side. One problem with drilling long holes with small diameters is a deviation of the drill, i.e. a deviation to the side.

SUMMARY

The hydraulic block according to the disclosure is made by casting, i.e. from a material that is shapeless during manufacture and that solidifies to a solid body, namely the hydraulic block. For example, casting, die casting or sintering of the hydraulic block are possible. The receptacles for the hydraulic components and the lines can for example be made by a grid like core that comprises the shape of the receptacles and the lines in the geometric arrangement thereof relative to each other. In particular, a lost core is used, which following the casting of the hydraulic block is, for example, destroyed chemically, thermally and/or mechanically (by vibrations) and removed from the cavities of the hydraulic block, namely the receptacles for the hydraulic components and the lines.

The hydraulic block according to the disclosure is preferably made by 3D printing, i.e. with a machine that builds up the three-dimensional hydraulic block for example in layers. 3D printing methods comprise an application process and a hardening process, for example selective laser melting, selective laser sintering, selective electron beam melting or stereo lithography.

Both the manufacture of the hydraulic block according to the disclosure by casting in general and also the manufacture by 3D printing specifically avoid metal cutting costs with tool wear and loss of material, and enable a significantly greater design freedom such as non-straight line runs, non-circular cross-sections, cross-section tapers and widenings and lines that end at both ends within the hydraulic block without opening outwards. Moreover, tolerances are smaller for long lines.

The dependent claims relate to advantageous embodiments and developments of the disclosure.

BRIEF DESCRIPTION OF THE DRAWINGS

The disclosure is described in detail below using an embodiment that is illustrated in the figures.

DETAILED DESCRIPTION

Figure 1:
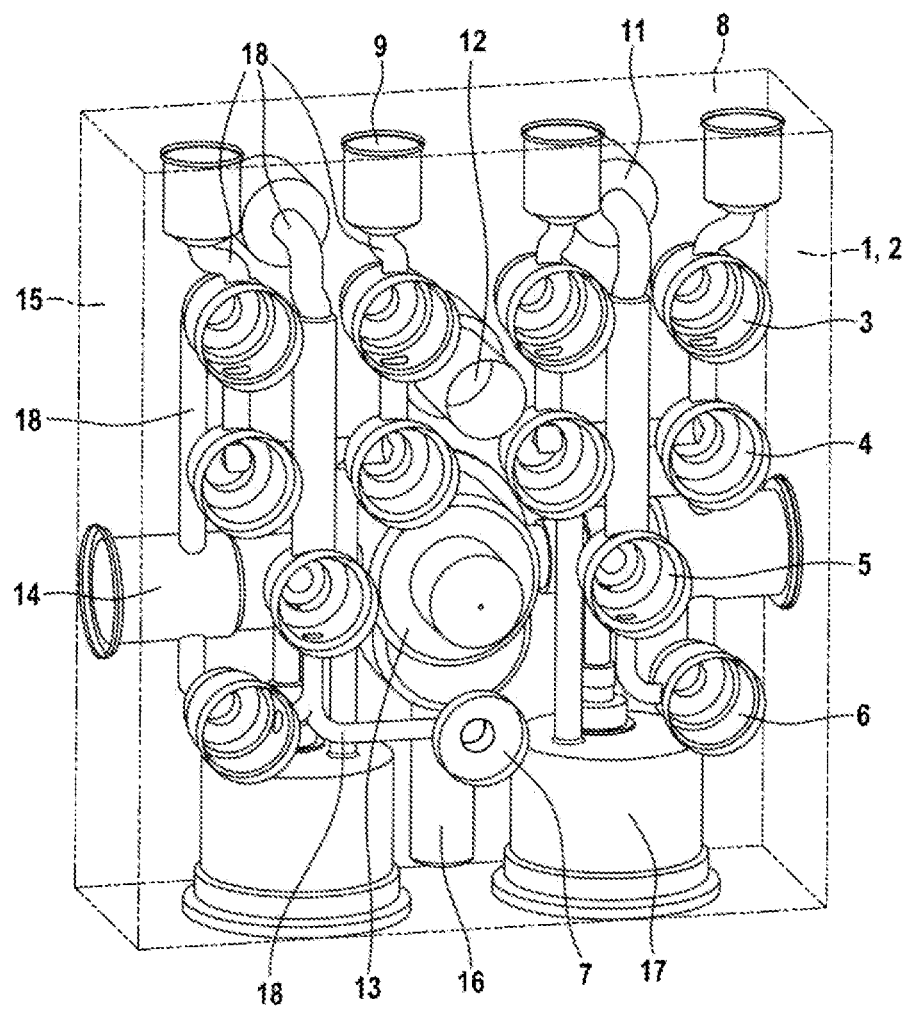
FIG. 1 shows a hydraulic block according to the disclosure in a perspective illustration from a first side.
Figure 2:
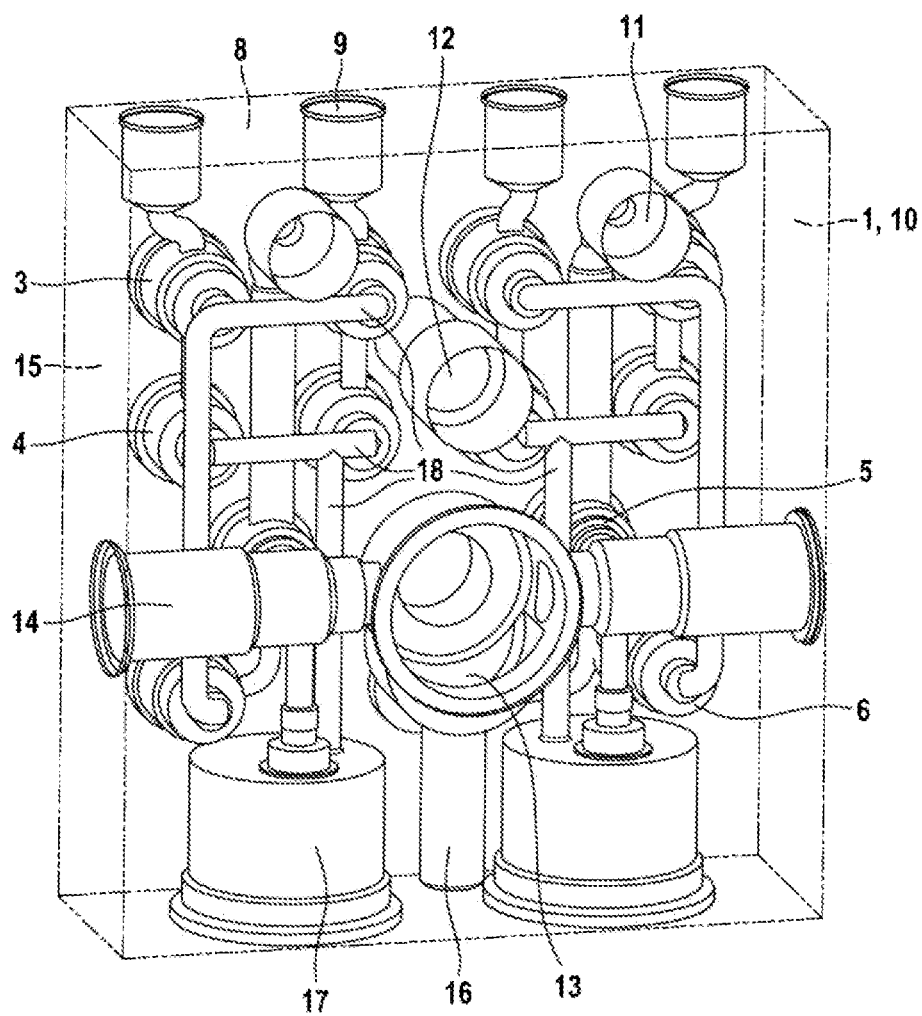
FIG. 2 shows the hydraulic block of FIG. 1 in a perspective illustration from a second side opposite the first side.

The hydraulic block 1 according to the disclosure that is illustrated in FIGS. 1 and 2 is made of metal with a 3D printer, i.e. made in layers, wherein the hydraulic block 1 is not a composite layered body, but the successively applied layers have been joined to form a homogeneous body. The 3D printing methods used are for example selective laser melting, selective laser sintering or electron beam melting. The hydraulic block 1 is cuboid and rectangular, approximately square, in plan view and comprises a height of about ¼ of the width or length thereof. The 3D printing can also be regarded as casting from a metal that is shapeless during manufacturing, for example in the form of a liquid, paste, grain, powder, chips or fibers, which solidifies, conglomerates and/or hardens to form the solid hydraulic block 1.

The hydraulic block 1 comprises receptacles for hydraulic components of a brake controller of a hydraulic vehicle brake system. Such components are for example hydraulic pumps, solenoid valves, non-return valves, pressure sensors, hydraulic reservoirs and dampers. The receptacles are implemented as cylindrical and stepped diameter blind holes, wherein the manufacture of the hydraulic block 1 by 3D printing also enables non-circular, round or polygonal blind holes, the cross-sectional shape and size of which can even vary over a depth of the receptacles. As can be seen in FIG. 1, the hydraulic block 1 comprises receptacles for solenoid valves that are disposed in four rows in a flat side of the hydraulic block 1, which is referred to here as the valve side 2. Four receptacles 3 for inlet valves are disposed next to each other in a first row, four receptacles 4 for outlet valves in a second row, two receptacles 5 for isolating valves in a third row and two receptacles 6 for outlet valves in a fourth row. The solenoid valves that are not shown are pressed into the receptacles 3, 4, 5, 6 and are held sealed pressure tight in the receptacles 3, 4, 5, 6 by "self-clinching". Self-clinching means that the sealing of the solenoid valves in the receptacles 3, 4, 5, 6 is carried out by pressing in the solenoid valves. The hydraulic block 1 comprises a receptacle 7 for a pressure sensor in the longitudinal center between the two receptacles 6 for the induction valves.

The hydraulic block 1 comprises four connections 9 for brake lines for connecting to hydraulic wheel brakes on a lateral side 8 close to one of the receptacles 3 for the inlet valves. On a flat side opposite the valve side 2, which is referred to here as the motor side 10, the hydraulic block 1 comprises two connections 11 for brake lines for connecting to a dual circuit master brake cylinder that is not shown. The connections 11 for the master brake cylinder are close to the lateral side 8 of the hydraulic block 1, on which the connections 9 for the wheel brakes are located, each being disposed between two of the connections 9 for the wheel brakes. The connections 9, 11 are in the form of cylindrical blind holes, which are also provided for connections by "self-clinching". Other connections, for example by screwing, are also possible.

Also in the longitudinal center, the hydraulic block 1 comprises a cable hole 12 extending from the valve side 2 to the motor side 10 for feeding through electrical lines and a stepped diameter blind hole as an eccentric element chamber 13. The cable hole 12 is located between the first two rows of receptacles 3, 4 for the inlet and the outlet valves and the eccentric element chamber 13 is located at the height of the receptacles 5 for the isolating valves, but on the opposite flat side of the hydraulic block 1, namely the motor side 10. Pump receptacles 14, which are open on longitudinal sides 15 of the hydraulic block 1, open into the eccentric element chamber 13. The pump receptacles 14 are provided for piston pumps that are not shown in the form of hydraulic pumps or pump elements of the brake controller and that are driven by an eccentric element that is not shown and that is disposed in the eccentric element chamber 13. An electric motor that is not shown is used to drive the eccentric element and may comprise a flanged reduction gearbox that is mounted coaxially to the eccentric element chamber 13 on the motor side 10 of the hydraulic block 1.

At intersections of the lines 18 and at openings of the lines 18 in the receptacles 3, 4, 5, 6, 7, 14, 17 for the hydraulic components of the brake controller and in the connections 9, 11 for the wheel brakes and for the master brake cylinder, edges of the openings comprise chamfers or curves instead of corners. This prevents high mechanical stresses and possibly crack formation, improves through flow and reduces noise generation. Furthermore, the risk of the deposition and collection of dirt is reduced.

A cavity forming a leakage reservoir 16 for any brake fluid emanating from the piston pumps communicates with the eccentric element chamber 13. The leakage reservoir 16 is located in the longitudinal center of the hydraulic block 1 and ends before a lateral side of the hydraulic block 1 that is opposite the lateral side 8 that comprises the connections 9 for the wheel brakes. The leakage reservoir 16 thus comprises no outward opening that has to be closed. The manufacture of the leakage reservoir 16 without a mouth or other outward opening is possible owing to the manufacture of the hydraulic block 1 by 3D-printing.

Besides the leakage reservoir 16, the hydraulic block 1 comprises two receptacles 17 for hydraulic reservoirs, which are disposed as blind holes on the lateral side of the hydraulic block 1, on which the leakage reservoir 16 is also disposed and which is opposite the lateral side 8 with the connections 9 for the wheel brakes.

The receptacles 3, 4, 5, 6 for the solenoid valves, the receptacle 7 for the pressure sensor, the connections 9, 10 for the wheel brakes and the master brake cylinder, the pump receptacles and the receptacles 17 for the hydraulic reservoirs are connected to each other by means of lines 18, i.e. are connected hydraulically to each other. The manufacture of the hydraulic block 1 by 3D-printing enables in principle any line runs, i.e. the lines 18 can not only run straight, but also in a curved or angled manner In addition, lines that are not orthogonal but that run inclined to surfaces and edges of the hydraulic block 1 are more easily possible owing to the manufacture of the hydraulic block 1 by 3D printing than by drilling. Moreover, changes of cross-section of the lines are easily possible and the lines 18 do not have to be led to the outside of the hydraulic block 1, but can end as stub lines within the hydraulic block 1. As already stated, owing to the 3D printing of the hydraulic block 1, receptacles, lines and connections with non-circular, curved or polygonal cross-sections are possible, wherein cross-sectional shapes and sizes can change, even narrowing and then widening again.

When fitted with the hydraulic components, the hydraulic block 1 forms a hydraulic unit of the brake controller of a hydraulic vehicle brake system, with which wheel brake pressures in wheel brakes of the vehicle brake system can be regulated for individual wheels in a known manner The hydraulic block 1 is used for the mechanical mounting and hydraulic connection of the hydraulic components of the brake controller.

What is claimed is:

1. A hydraulic block for a hydraulic unit of a brake controller of a hydraulic vehicle brake system, comprising:
   a hydraulic block body formed as a homogeneous single piece structure;
   a plurality of receptacles defined in the hydraulic block body and configured for hydraulic components of the brake controller; and
   a plurality of lines defined in the hydraulic block body and configured to at least one of (i) port the hydraulic components and (ii) connect the hydraulic components,
   wherein the hydraulic block is formed by casting, die casting, sintering, or 3D printing,
   wherein at least one line of the plurality of lines includes a straight portion having a central axis that runs in an axial direction of the straight portion of the at least one line, and
   wherein linear extensions of the central axis of the straight portion pass, in both directions along the axial direction, through portions of the homogeneous single piece structure of the hydraulic block body.

2. The hydraulic block according to claim 1, wherein the hydraulic block is formed by 3D printing.

3. The hydraulic block according to claim 1, wherein one or more of the plurality of lines is a stub line.

4. The hydraulic block according to claim 1, wherein:
   the plurality of lines further include at least one of:
     first mouths located at intersections of the plurality of lines, the first mouths having first edges; and second mouths located at openings of the plurality of lines into the plurality of receptacles, the second mouths having second edges; and at least one of the first mouths and the second mouths includes chamfers or curves.

5. The hydraulic block according to claim 1, wherein at least one of the plurality of receptacles has a non-circular cross-section.

6. The hydraulic block according to claim 1, wherein:

one or more of the plurality of lines includes a first portion having a first central axis and a second portion having a second central axis;

the first central axis and the second central axis intersect so as to define an angle.

7. The hydraulic block according to claim 1, wherein one or more of the plurality of lines includes at least one curved portion, the at least one curved portion having a central axis that is curved.

\* \* \* \* \*